No. 848,464. PATENTED MAR. 26, 1907.
C. F. HIPPARD.
VINE AND WEED CUTTER.
APPLICATION FILED AUG. 10, 1906.
2 SHEETS—SHEET 1.
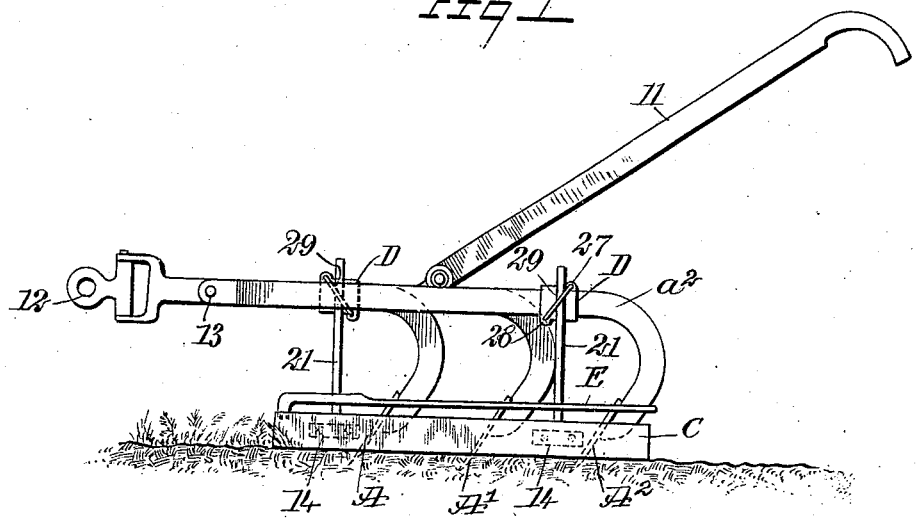
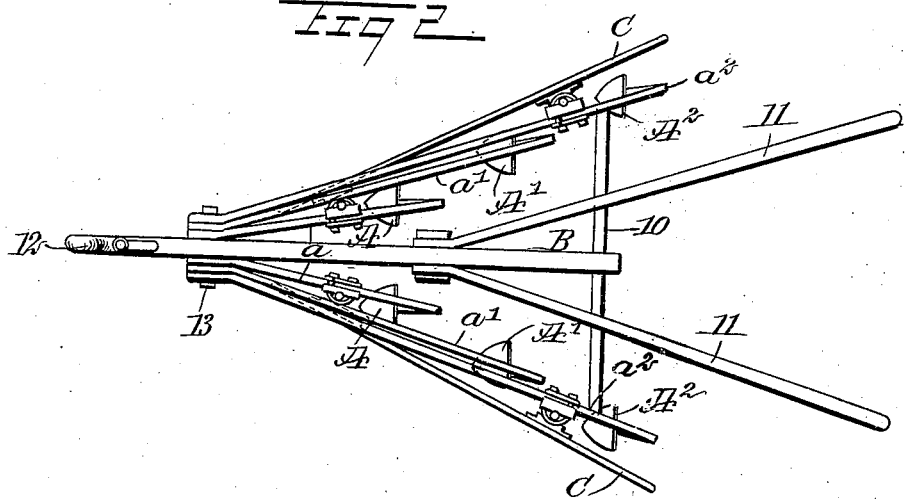
WITNESSES
INVENTOR
Charles F. Hippard
BY Munn & Co.
ATTORNEYS

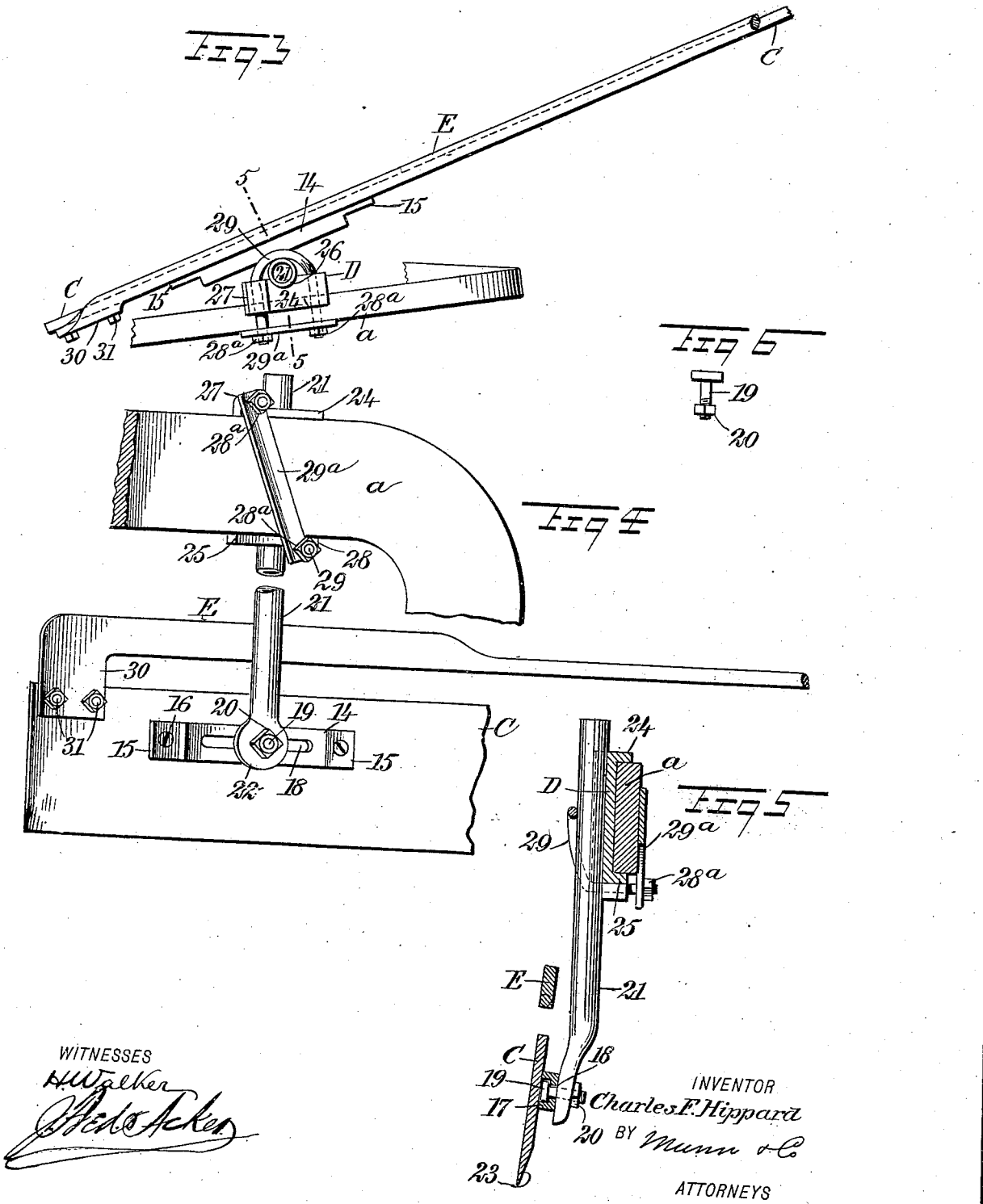

UNITED STATES PATENT OFFICE.

CHARLES F. HIPPARD, OF MINONK, ILLINOIS.

VINE AND WEED CUTTER.

No. 848,464.      Specification of Letters Patent.      Patented March 26, 1907.

Application filed August 10, 1906. Serial No. 330,015.

*To all whom it may concern:*

Be it known that I, CHARLES F. HIPPARD, a citizen of the United States, and a resident of Minonk, in the county of Woodford and State of Illinois, have invented a new and Improved Vine and Weed Cutter, of which the following is a full, clear, and exact description.

The purpose of the invention is to provide a vine and weed cutting attachment adapted for ready application to any type or size of cultivator and which will accomplish most effective work in killing any kind of weeds or vines that may be outside a row of corn, for example. It not only cuts and entirely eradicates the weeds or vines, but it pushes them midway between the rows.

Another purpose of the invention is to so construct the knives and the attaching mediums therefor that the knives will be in front of the cultivator-blades practically parallel with their alinement, yet sufficiently far removed from said cultivator-blades as not to interfere with the functions of the latter.

It is also a purpose of the invention to so construct the attachment that the knives thereof can be set to run deep or run shallow, as the conditions of the ground may require. Should the ground be loose, it would be necessary to set the knives deep enough to catch the vines in solid ground to insure their complete extermination; but should the ground be hard and packed the blades may be set just so that they will do the work, and in either event there is but slight difference in the draft of the plow.

Another purpose of the invention is to construct a vine or weed cutter that will work through trash and not become clogged and which will prevent the vines or weeds from getting on or clinging to the beams of the cultivator, and wherein the cultivator will have a good clean ground to work over, thus rendering the cultivation of a field more perfect than it is possible to effect without the cutting attachment.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of a cultivator and applied cutting attachment. Fig. 2 is a plan view of the cultivator and attachment. Fig. 3 is an enlarged detail plan view of the right-hand cutter and the first cultivator-beam. Fig. 4 is an inner face of the parts shown in Fig. 3. Fig. 5 is a vertical section taken practically on the line 5 5 of Fig. 3, and Fig. 6 is a detail view of a bolt used for adjustably attaching a supporting-standard to the knife.

The cultivator herein shown is provided with six shares or shovels located in a gang of three at each side of the draft-beam B. These shovels or shares are designated, respectively, as A, A', and $A^2$, and their beams are designated, respectively, as $a$, $a'$, and $a^2$. The rear beams $a$ are connected with the draft-beam B by a cross-bar 10, and handles 11 are secured in the customary way upon the said draft-beam B, which terminates at its forward end in a suitable clevis 12. All of the cultivator-beams $a$, $a'$, and $a^2$ are connected to the forward portion of the draft-beam B by a single bolt 13.

In connection with each gang of cultivator shares or shovels a knife C is employed. Said knives are located outside of said gangs of shovels, as best shown in Fig. 2, being separated from their outer edges by about five or six inches, so that the knives will not interfere with the functions of said shovels, and the knives are supported from the front and the rear cultivator-beams $a$ and $a^2$ in such manner that the knives C are practically parallel with the gangs of shovels.

The knives C extend beyond the forward shovels and likewise beyond the rear shovels, as is shown in Fig. 1. Each knife is provided with a longitudinal keeper 14 upon its rear face, a keeper being located near each end, and each keeper is provided with flanges 15 at its ends, apertured to receive bolts or rivets 16, whereby to secure the keepers to the knives. Each keeper is provided also with a longitudinal chamber 17, open at the back, and with a longitudinal slot 18 in its inner face connecting with the aforesaid chamber 17, as is best shown in Fig. 5.

The chamber 17 of each keeper 14 is rectangular in cross-section and receives a correspondingly-formed head of a bolt 19, whose threaded end extends out through the slot 18 in the keeper, and the outer end of the bolt 19 is provided with a nut 20. A standard 21, solid or tubular, is provided with each keeper 14, and the lower ends of said standards 21 are flat and are given a slight downward and outward inclination, so that when the flattened portions of the standards are secured to the knives through the medium of the aforesaid keepers and bolts the knives are given an outward and downward inclination, which tends to throw off the material cut from the ground and likewise renders the cutting edge of the knives more effective, the said cutting edges 23 of the knives being beveled upon their inner faces, as is shown in Fig. 5.

The standards are attached to the knives by passing the bolts 19 through apertures in the flattened portions of the standards and then screwing the nuts 20 to place. It will be observed that the bolts 19 are adjustable longitudinally in the keepers 14, thus rendering it possible to adjust the knives to different types and sizes of cultivators, and that the bolts are held from turning in the keepers by reason of the polygonal formation of their heads and corresponding cross-sectional formation of the chambers in which said heads are entered.

A bearing D is employed in connection with each standard 21 to adjustably connect the upper ends of the standards with the cultivator-beams to which they are to be attached. Each bearing D consists of a body portion having its inner face flattened to engage with the outer side face of a cultivator-beam—the beam $a$, for example—as shown in Fig. 5, and the said body of the bearing is provided with an upper horizontal flange 24 and a lower horizontal flange 25, adapted to engage, respectively, with the upper and the lower edges of the cultivator-beam, as is also shown in Fig. 5.

At the central portion of the outer face of each bearing D a vertical segmental groove 26 is produced, extending from top to bottom of the bearing, in which groove the upper portion of a standard 21 is received. A projecting eye 27 is produced upon the upper edge of each bearing D, while a similar eye 28 is formed at the lower edge of the bearing, the two eyes being diametrically opposite. The threaded ends of a U-shaped clip 29 is passed through these eyes 27 and 28, and consequently passes at the top and bottom of the cultivator-beam, as shown in Fig. 4, and the body portion of said clip has firm bearing against the outer face of the standard 21 in engagement with the bearing to which the clip is applied. A backing-plate 29ª is apertured to receive the end portions of the said clip 29, and the said backing-plate has bearing against the inner side face of the cultivator-beam diagonally thereof, as also shown in Fig. 4, and said clip is held locked to the beam by suitable nuts 28ª, secured to the ends of the said clip. Thus it will be observed that the knives may be adjusted up or down, as may be occasioned by the character of the ground, to cause the knives to cut more or less deeply.

A guard E is located above the upper edge of each knife C, and said guards extend from the front of the knife beyond the rear end and are spaced from the upper edge of the knives a desired distance for the purpose of permitting the loose earth to sift through said opening to the cultivator shovels or shares and yet prevent any of the cut vines or weeds from gaining access to the said shovels or shares or to the beams carrying them. The guards are given more or less of a downward and outward inclination, as is shown in Fig. 5, so as to facilitate the shedding off of the turned-up and cut vines and weeds.

Preferably the guards are wider at their forward ends than at any other portions in their length, as shown in Figs. 1 and 4, since at such points they have the most duty to perform, and each guard E is provided with a downwardly-extending member 30 at its forward end. This member is secured to the inner face of a knife C as close as possible to its forward edge, the attachment being made through the medium of suitable bolts and nuts 31 or their equivalents.

If in practice it is found desirable, the guards E may be adjustably secured to the knives, in which event it is simply necessary to duplicate the holes in the knives through which the bolts attaching the guards to said knives pass.

Having thus described my invention, I claim as new and desire to secure by Letters Pattent—

1. The combination with a cultivator, of knives supported parallel with the shovels on the cultivator, and a guard located at the upper edge of each knife and spaced from said edge.

2. In a cultivator, knives adapted for engagement with the ground and supported substantially parallel with the shovels of the cultivator, the said knives being spaced from the outer edges of the shovels and extending beyond the forward and the rear shovels, and means for adjusting said knives vertically and laterally.

3. In a cultivator, knives adapted for engagement with the ground located substantially parallel with the side gangs of shovels of the cultivator a distance from the outer edges of said shovels, and means for adjusting said knives vertically and laterally.

4. In a cultivator, knives adapted for engagement with the ground, located substantially parallel with the outer edges of the side gangs of shovels for the cultivator, supports for the knives connected with the shovel-beams of said cultivator, and means for vertically and laterally adjusting said supports.

5. In cultivators, the combination with the beams, thereof and the shovels carried by the beams, said shovels being arranged in side gangs, of a knife for each gang of shovels, located outside of said shovels and substantially parallel with their outer edges, supports for said knives connected with the shovel-beams, and a guard located at the upper edge of each knife and spaced from said edge.

6. In a cultivator, the combination with the draft-beam and the shovel-beams, the shovels on the said beams being arranged in side gangs, of a knife for each side gang of the cultivator-shovels and adapted for engagement with the ground, said knives being spaced from the outer edges of said shovels and having a downward and outward inclination, supports for said knives, and devices for adjustably attaching said supports to the knives and to the shovel-beams.

7. In a cultivator, the combination with the draft-beam and the shovel-beams, the shovels on the said beams being arranged in side gangs, of a knife for each side gang of cultivator-shovels and adapted for engagement with the ground, said knives being spaced from the outer edges of said shovels and having a downward and outward inclination, supports for the said knives, devices for adjustably attaching the said supports to the knives and to the shovel-beams, and a guard for each of the knives, secured at their forward edges and extending parallel with the upper edges of said knives to their rear edges, a space intervening between the guards and the knives, for the purpose described.

8. In a cultivator, the combination with the draft-beam and shovel-beams connected therewith, the shovels on the said shovel-beams being arranged in side gangs, of knives adapted for engagement with the ground and located opposite the outer side edges of the said shovels and practically parallel with the gangs of shovels, keepers secured to the said knives, bolts mounted to slide in the said keepers, being held from turning therein, supports for the knives secured to the keepers by said bolts, bearings fitted to the shovel-beams, which bearings are provided with grooves to receive the upper ends of said supports, and clips passed through said bearings, extending over the top and beneath the bottom edges of the beams to which said bearings are applied.

9. In a cultivator, a knife adapted for engagement with the ground, means for supporting the knife at the outzr side of the shovels of the cultivator, and a guard carried by the knife and spaced from its upper edge.

10. In a cultivator, a knife adapted for engagement with the ground, and supports for said knife adapted for connection with the cultivator-beams, the said supports being adjustable laterally on the said knife.

11. In a cultivator, a knife supported parallel with the shovels on the cultivator, supports for said knife, and devices for adjustably securing said supports to the knife and to the shovel-beams.

In testimony whereof I have signed my name to this specification in the presence of two subscribing witnesses.

CHARLES F. HIPPARD.

Witnesses:
SAMUEL HIPPARD,
JAMES A. RIELY.